US012784083B2

(12) United States Patent
Mahoney et al.

(10) Patent No.: US 12,784,083 B2
(45) Date of Patent: *Nov. 3, 2026

(54) REAL-TIME IDENTIFICATION OF GARMENTS IN A RAIL-BASED GARMENT INTAKE PROCESS

(71) Applicant: ThredUp Inc., San Francisco, CA (US)

(72) Inventors: Joshua Mahoney, Union City, CA (US); John Voris, Los Gatos, CA (US); Jonathan Colt, Kula, HI (US); Keith Hiyama, Nashville, TN (US); Matthew Wolfe, Redwood, CA (US); Michael Santhanam, San Ramon, CA (US); Pramati Kalwad, Pasadena, CA (US); Vivek Daver, San Ramon, CA (US); Denis Troianov, Kyiv (UA); Serge Bondar, Tavastila (FI)

(73) Assignee: ThredUp Inc., San Francisco, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/962,178

(22) Filed: Nov. 27, 2024

(65) Prior Publication Data

US 2025/0232342 A1 Jul. 17, 2025

Related U.S. Application Data

(63) Continuation of application No. 17/552,901, filed on Dec. 16, 2021, now Pat. No. 12,190,361.

(51) Int. Cl.

*G06Q 30/00* (2023.01)
*G06Q 30/0601* (2023.01)
*G06V 10/764* (2022.01)

(52) U.S. Cl.

CPC ....... *G06Q 30/0601* (2013.01); *G06V 10/764* (2022.01)

(58) Field of Classification Search

CPC ................................................ G06Q 30/06–08

See application file for complete search history.

(56) References Cited

U.S. PATENT DOCUMENTS 9,188,840 B1 11/2015 Voris et al.
9,773,269 B1 9/2017 Lazarus (Continued)

OTHER PUBLICATIONS

CE Noticias Financieras, "App Finds for You Affordable Versions of Celebrity Clothes; Check", Jul. 23, 2021, pp. 1-5.

(Continued)

*Primary Examiner* — Ethan D Civan

(74) *Attorney, Agent, or Firm* — Fenwick & West LLP

(57) ABSTRACT

A garment marketplace maintains a population of stored garments, and each of those garments is associated with a display image and a characteristic vector representing characteristics of the garment. The garment marketplace receives an intake garment and obtains a classification image of the intake garment. A garment identification system determines whether the intake garment is the same as one of the stored garments. To do so, the garment identification system applies a garment identification model to the classification image. The model generates a characteristic vector representing the intake garment. If the characteristic vector for the intake vector is the same as a characteristic vector for a stored garment, the garment identification system determines the intake garment is the same as the stored garment.

17 Claims, 6 Drawing Sheets

(56) References Cited

U.S. PATENT DOCUMENTS

| | | | |
|---|---|---|---|
| 10,450,139 B2 | 10/2019 | Friedl et al. | |
| 10,616,545 B2 | 4/2020 | Voris et al. | |
| 11,423,648 B2 | 8/2022 | Zucker et al. | |
| 12,190,361 B2 * | 1/2025 | Mahoney | G06Q 30/0643 |
| 2017/0147900 A1 | 5/2017 | Booth | |
| 2017/0337508 A1 | 11/2017 | Bogolea et al. | |
| 2018/0130197 A1 | 5/2018 | Weiss et al. | |
| 2019/0080207 A1 | 3/2019 | Chang et al. | |
| 2021/0365719 A1 | 11/2021 | Kalyuzhner et al. | |

OTHER PUBLICATIONS

United States Office Action, U.S. Appl. No. 17/552,901, filed May 15, 2024, 13 pages.

* cited by examiner

REAL-TIME IDENTIFICATION OF GARMENTS IN A RAIL-BASED GARMENT INTAKE PROCESS

CROSS-REFERENCE TO RELATED APPLICATION

This application is a continuation of co-pending U.S. application Ser. No. 17/552,901 filed Dec. 16, 2021, the contents of which is hereby incorporated by reference in its entirety.

BACKGROUND OF THE INVENTION

This disclosure relates generally to a garment classification system, and more specifically to determining whether an intake garment is the same as a stored garment based on the classification of the intake garment by the garment classification system.

Traditionally, retailers have maintained a limited population of items at a store-front or storage facility for order fulfillment. However, modern technology has increased the ability of retailers to maintain an increasing number of items in the population that are available to customers for order fulfillment. With the increase of the number of items in the population, systems for efficient intake and storage of items in that population has generated a series of complex challenges.

To illustrate, one challenge is that current intake processes receive, classify, and image each unique garment for storage in the population. They do so even if an identical item has already been imaged for the population. That is, if a received item is the same as a previously received item that has already been imaged, traditional intake systems will image the item again. This redundant intake process is both inefficient and time-consuming. Described herein is a garment identification system that allows for classification of a received item. The classification enables the garment identification system to determine whether the received item is the same as a previously received item. If the item has been previously received, the intake process can proceed more efficiently than traditional methods by not imaging the item again.

SUMMARY OF THE INVENTION

Disclosed herein is a garment marketplace including a garment intake process configured to identify intake garments. To provide context, the garment marketplace stores garments, and each of the stored garments has been previously identified during the garment intake process. Each stored garment is also associated with an image stored in a database ("stored image") for displaying to users accessing the stored garment via an online portal. Additionally, each stored garment is associated with a stored characteristic vector representing characteristics of the stored garment (e.g., size, color, designer, etc.). The garment marketplace is configured to access stored images and stored characteristic vectors as part of the intake process.

To identify a new garment, the garment marketplace receives a new intake garment and begins the intake process. The garment marketplace captures an image of the intake garment ("intake image"). The garment marketplace accesses a garment identification model trained to receive the intake image and output a classification vector thereof (e.g., a classification vector), and applies the garment identification model to the intake image. The garment identification model outputs a characteristic vector of the intake garment ("intake characteristic vector") representing characteristics of the intake vector identifiable in the image.

In some cases the intake garment may be highly similar to one of the stored garments. To determine if this is the case, the garment marketplace the calculates distances between the intake characteristic vector and the stored characteristic vectors of the stored garments. The garment marketplace then identifies a stored garment as a candidate garment. A candidate garment is a stored garment that might be the same as the intake garment.

Candidate garments are identified as such when a confidence value representing the distance between the stored characteristic vector for the candidate garment and the intake characteristic vector for the intake garment are above a threshold. That is, when the distance between intake characteristic vector and the stored characteristic vector indicate that the two garments are likely the same. The garment marketplace stores the stored image for the candidate garment as the stored image for the intake garment.

In this manner, the garment marketplace does not have to capture high quality images of the intake garment for display. However, if the distances between the intake characteristic vector and the stored characteristic vectors are below a threshold, the garment marketplace may translate the intake garment to a garment processing system. The garment processing system may then generate an image of the intake garment for storage as a display image for the intake garment.

In some configurations, identifying the stored garment can include user interaction. For example, the garment marketplace may send the stored image for the candidate garment to a user device and receive a confirmation from the user that the candidate garment matches the stored garment. In a second example, the garment marketplace may identify more than one candidate garment and send the display images for the more than one candidate garment to a user device. The garment marketplace may then receive a selection from the user as to which of the more than one candidate garments match the intake garment. Additionally, the garment intake system may receive feedback from the user regarding match quality, and the system may use that information to further train the garment identification model.

The garment intake process may occur while the intake garment is translating along a rail-based garment translation system. Moreover, the garment identification model increases the efficiency of the rail-based intake process in several manners. One or more of the efficiency processes described above may process the intake image in one manners to normalize image characteristics to those of the stored images.

First, the garment identification model can identify an intake garment in less than a threshold amount of time, where the threshold time may be an amount of time a human operator may take to identify the characteristics.

Second, the garment identification model can receive various elements of the intake characteristic vector (e.g., from a user or operator) to increase the speed at which the garment intake system identifies garments (e.g., by filtering stored characteristic vectors before calculating distances).

Third, the garment marketplace may be configured to separate the intake image into a foreground and a background. Once separated, the garment identification model may only generate characteristic vectors based on the foreground. Separation allows the model to operate on fewer pixels, making it more efficient.

Fourth, the garment marketplace may be configured to identify visual fiducials in the intake image and generate intake characteristic vectors based on the identified fiducials.

Additionally, the structure of the garment identification model informs the garment identification process. For instance, the garment identification model may be a convolutional neural network. In this case, applying the garment identification model to generate the characteristic vector may extract the characteristic vector from a layer of the garment identification model. Additionally, applying the garment identification model to the intake image may extract the characteristic vector from an intermediate layer of the garment identification model, and extract the characteristic vector from an output layer of the garment identification model.

BRIEF DESCRIPTION OF THE DRAWINGS

The invention has other advantages and features which will be more readily apparent from the following detailed description of the invention and the appended claims, when taken in conjunction with the accompanying drawings, in which:

The figures and the following description depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

I. Garment Marketplace

Figure 1:
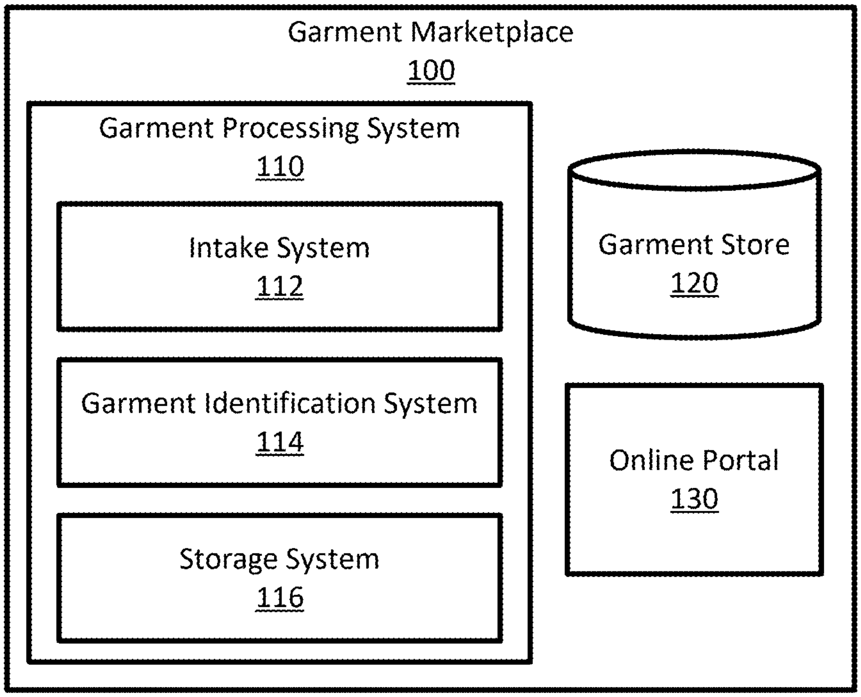
FIG. 1 is an illustration of a garment marketplace, according to one example embodiment.

FIG. 1 is an illustration of a garment marketplace, according to one example embodiment. A garment marketplace 100 includes a garment processing system 110, a garment store 120, and an online portal 130. In various other embodiments, the garment marketplace 100 can include additional or fewer systems, or the system may be combined in another manner.

Broadly, the garment marketplace 100 place allows users to buy and sell garments to one another via an online portal 130. For example, the garment marketplace 100 may allow three unique users to interact in order to purchase and sell garments. To illustrate, a first user may access the online portal 130 to send a first garment to the garment marketplace 100 for storage in a garment store 120 until it is sold via consignment on the online portal 130. A second user may access the online portal 130 to sell and send a second garment to the garment marketplace 100, which then stores the garment in the garment store 120 before resale via the online portal 130. A third user may access the online portal 130 to purchase both the first and second garments, and the garment marketplace 100 sends the third user the first and second garments. In this case, the first user would receive some portion of the proceeds for the sale of the first garment because it was offered for sale on the garment marketplace 100 via consignment.

In other words, the online portal 130 provides access to the garment marketplace 100 and enables individual users to offer garments for sale, buy garments from the garment store 120, managed consigned garments, and more generally enables the functionality of the garment marketplace 100. The online portal 130 may be a website, a phone application, or some other service that provides access to the functionality of the garment marketplace 100. In an embodiment, the online portal 130 is a website that maintains a retail page for each individual garment maintained in the garment marketplace 100. Thus, users can navigate between retail pages on the website as if they are browsing a store. The website also includes functionality that enables a user to send garments to the garment marketplace 100 for resale or consignment.

The garment store 120 stores garments in the garment marketplace 100. In an example configuration, the garment store 120 is a translatable rail system, or garment conveyor. The translatable rail system comprises item storage locations, and each garment may be stored in one or more of the item storage locations. Because the garment store is translatable, the item storage locations may be translated throughout the garment store 120 for ease of access. An example garment store is found in U.S. Pat. No. 10,450,139, which is hereby incorporated by reference in its entirety.

As part of its buying and selling process, the garment marketplace 100 processes received garments with a garment processing system 110. The garment processing system 110 includes an intake system 112, a garment identification system 114, and a storage system 116. In various other embodiments, the garment processing system 110 can include additional or fewer systems, or the system may be combined in another manner.

Broadly, the garment processing system 110 processes received garments storage in the garment store 120 ("stored garment") and sale via the online portal 130. That is, users browse and buy stored garments from the garment store 120 via the online portal 130, and the garment marketplace 100 sends the purchased garments to the purchasing user.

The garment intake system 112 is configured to receive garments from users of the garment marketplace 100 ("intake garments") and prepare them for storage. Receiving garments can include unpackaging the garment from a parcel, unpacking the garment from a shipping crate, etc. Garment intake can also include placing the garment onto a conveyor for translation through the garment marketplace 100 (e.g., a rail-based garment conveyor). To illustrate, the intake system 112 can remove a garment from a parcel, hang the garment on a hanger, and place the hanger on a rail-based conveyor.

The garment identification system 114 is configured to identify a garment. Garment identification is a multi-faceted process that may include taking an image of the garment, accessing an image of the garment, generating a unique shop keeping unit ("SKU") for the garment, accessing or receiving characteristics of the garment (e.g., from a user), classifying the garment with a machined-learned model, querying a user to identify a garment, etc. The garment identification system 114 is described in greater detail below in regard to FIG. 2.

The storage system 116 is configured to store garments in the garment store 120. For example, the storage system 116 may translate the garments to the garment store 120 along a rail system, using robotic automation, human assistance, or some combination thereof. The unique SKU assigned to each garment by the garment processing system 110 is used to track each unique garment within the garment marketplace 100. For example, the garment marketplace 100 may monitor the location of garment in the garment store 120 using its unique SKU.

Processing intake garments for the garment marketplace 100 is a difficult problem because each garment is generally unique. Thus, in the garment marketplace 100, each intake garment must be identified, catalogued, and associated with a unique SKU such that it can be sold on the garment marketplace 100. The economies of scale available to traditional garment marketplaces are generally less available to the garment marketplace 100. To illustrate, consider a traditional garment marketplace of a sweater store. The sweater store may receive a batch of 250 identical sweaters for sale on the traditional garment marketplace. There, rather than processing each sweater individually, the sweater shop need only process one sweater from the batch for their marketplace. Each sweater in the batch may be given the same SKU and treated similarly by a traditional garment marketplace's online portal because they are identical. However, in the garment marketplace 100, intake garments are received from individual users and are highly variable. As such, batch processing and tracking of intake garments is not possible and intake garments are processed individually.

II. Garment Identification System

Because of the problems described above, methods to increase garment processing efficiency for unique garments is beneficial. One method to increase garment processing efficiency is to identify garments that have been previously processed by the garment identification system 114 (and/or stored in the garment store 120) and reducing processing redundancy for those garments in response. For instance, consider a situation where two independent users own two nearly identical dresses. The dresses are the same size, make and model, color, and have approximately the same level of wear. The first user sends her dress to the garment marketplace 100 and the garment marketplace 100 processes the dress by unpacking the dress, identifying its make, model, size, and color, imaging the dress for the online portal 130 of the garment marketplace 100, and translating it to the garment store 120. Of these, imaging the dress for the garment store 120 is the most time consuming and labor-intensive aspect of garment processing. For instance, imaging the dress for the online portal 130 may take around one minute. Thus, imaging thousands of unique garments quickly compounds labor and time costs for the garment processing system 110.

Now, continuing the example, the second user sends his dress to the garment marketplace 100 and the garment processing system 110 begins to process the dress. Because the second user's dress is nearly identical to that of the first user, some aspects of garment identification may be redundant and their removal from the intake process may increase the garment processing efficiency of the garment marketplace 100. For instance, imaging an intake garment (e.g., the second dress) that is nearly identical to a stored garment (e.g., the first dress) may be inefficient and cost ineffective for the garment marketplace 100. Accordingly, the garment identification system 114 is configured to identify whether an intake garment is the same as, or is sufficiently similar to, a stored garment. Based on that identification, the garment identification system 114 determines whether the intake garment should be imaged for the online portal 130 of the garment marketplace 100.

Figure 2:
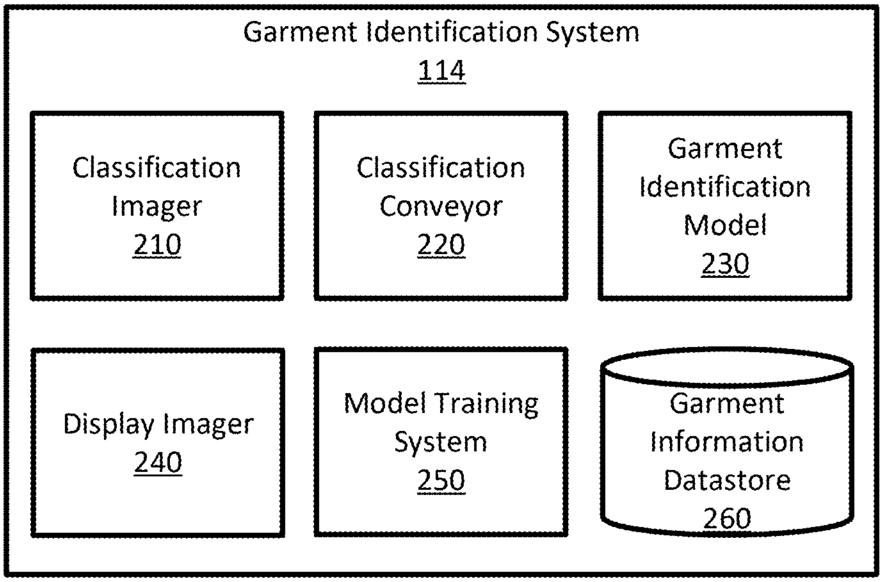
FIG. 2 is an illustration of a garment identification system, according to one example embodiment.

To enable garment identification and increase efficiency, the garment marketplace 100 includes a garment identification system 114. FIG. 2 is an illustration of a garment identification system, according to one example embodiment. The garment identification system 114 includes a classification imager 210, a classification conveyor 220, a garment identification model 230, a display imager 240, a model training system 250, and a garment information datastore 260. In various other embodiments, the garment processing system 110 can include additional or fewer systems, or the system may be combined in another manner.

The classification imager 210 is an imaging system configured to capture an image of an intake garment for classification ("classification image"). The classification imager 210 may be, for example, a camera configured to capture images of the garment as it is translated through the garment marketplace 100 by the classification conveyor 220. However, the classification imager 210 may be any number, manner, or combination of imaging systems configured to capture a classification image within the garment marketplace 100. For instance, the classification imager 210 may be a pair of stereo cameras, an HDR camera, a video recording device (where images are sampled from a video stream), a pair of cameras that images both the front and the back of the garment, etc.

The classification imager 210 is generally distinct from the display imager 240. The display imager 240 is an imaging system configured to capture images of the garment for the online portal 130 ("display images"). The display imager 240 may capture display images in a controlled studio environment that enables high-quality imaging of an intake garment, while the classification imager 210 captures classification images while the garment is on the classification conveyor 220. Example display imagers configured for generating display images are disclosed in U.S. Pat. Nos. 10,616,545 and 9,188,840, both of which are hereby incorporated by reference in their entirety. In some examples, classification images captured in this manner and are not configured for display on the online portal 130.

The classification imager 210 may also be configured to capture classification images with image properties appropriate for classification. For instance, the classification imager 210 may be configured to capture classification images at a specific white or color balance, maintain a white or color balance across multiple classification images, set appropriate focal planes, zooms, and focuses, or change other exposure and/or capture settings of the classification imager 210. Similarly, the classification imager 210 may manipulate a classification image after it is captured such that it is suitable for classification. For instance, the classification imager 210 may white or color balance a photo, up or down sample the image quality, crop, rotate, skew, or shift an image, identify a foreground and/or background of an image, identify fiducials within the classification image, perform optical character recognition on the classification image, etc. Whatever the case, the classification imager 210 captures an image of the garment sufficient for classifying a garment within that image.

The classification conveyor 220 translates garments within the garment marketplace 100 in a manner that promotes obtaining a classification image. For example, the classification conveyor 220 may include a translation system (e.g., a rail-based garment conveyor) configured to move garments at a particular speed, at a particular spacing, etc. such that the classification imager 210 may appropriately capture a classification image (i.e., to promote the image properties discussed above). Additionally, the classification conveyor 220 may include a lighting system that promotes appropriate capture or a classification image, and/or may include a rail system oriented and configured in a manner that enables appropriate capture of a classification image. The classification conveyor 220 may be a part of the classification conveyor 220 or may be a standalone system within the garment marketplace 100.

The garment identification model 230 is a machine learned model configured to classify a garment in a classification image. Classifying a garment may include identifying characteristics of the garment including color, size (e.g., small, hem length, etc.), make (e.g., designer), model (e.g., garment type), age (e.g., release year), wear level (e.g., well used or gently used), etc. of the garment. The garment identification model 230 may also identify other characteristics. The garment identification model 230 may output the results of the classification as a characteristic vector. The characteristic vector includes an array of elements describing characteristics of the garment identified in the classification image.

The garment information datastore 260 is a datastore that stores information corresponding to each of the garments stored by the garment marketplace 100. That is, for each garment in the garment store 120, the garment information datastore 260 stores information about each of those garments. The garment information datastore 260 can store a variety of information for each garment including: a previously captured display image (its "stored image"), its previously determined characteristic vector (its "stored characteristic vector"), metadata describing information in the characteristic vector, its location in the garment marketplace 100, its corresponding unique identification number (e.g., a QR code, barcode, SKU, etc.).

II.A Example Garment Classification

To illustrate the classification functionality of the garment identification system 114, consider a garment marketplace 100 that receives a suit coat. As part of the intake process, the classification imager 210 obtains a classification image of the suit coat (i.e., an intake garment). The classification image itself is an array of pixels that each have a color value and a location within the image (e.g., an x and y coordinate). While no one pixel may indicate that the classification image includes an image of a suit coat, the individual pixels and/or groups of pixels comprise latent information representing features and characteristics that indicate the classification image includes a suit coat. For instance, color values of pixels in the classification image may form one or more edges within the image and those edges may approximate the shape of a suit coat. Similarly, color values within those identified edges may indicate the color of the suit coat, while the length of the edges may indicate the size coat.

The garment identification system 114 applies the garment identification model 230 to the classification image. Based on recognition of latent features in the classification image, the garment identification model 230 generates a characteristic vector for the intake garment in the classification image. Each element of the characteristic vector represents a different identified feature or characteristic of the garment in the image (or a null value may represent an unidentified characteristic).

The garment identification model 230 classifies the intake garment based on elements in the characteristic vector representing identified features and characteristics of the garment (e.g., suit coat). For instance, the characteristic vector may include the elements (suit coat, black, Tuvo Baus, Medium, stain, right sleeve). In this case, the garment identification model 230 would classify the garment in the image as a medium-sized, black suit coat made by Tuvo Baus with a stain on the right sleeve.

Using this approach, the garment identification model 230 can classify any number of unique garments. That is, over time, the garment identification model 230 is trained to generate characteristic vectors that can identify any possible garment. Of course, training the garment identification model 230 to identify such a multitude of unique garments is a challenging process. Training the garment identification model 230 is described below.

II.B Quantifying Sameness

As will be described below, the garment identification system 114 can determine whether an intake garment is the same as, or substantially similar to, a stored garment based on their characteristic vectors. For convenience, hereinafter, determining whether a garment is "the same as, or substantially similar to" another garment will be referred to using only the former "the same as" or "the same." Moreover, the garment identification system 114 may determine a "sameness" between two garments using their characteristic vectors, and that sameness can also indicate substantial similarity.

The garment identification system 114 can determine the sameness between two garments in a variety of manners. In a first example, the garment identification system 114 determines sameness between garments based on a distance between the characteristic vector for the intake garment and a stored characteristic vector. If the distance is less than a threshold, the garment identification model 230 determines the intake garment and a stored garment are the same. In second example, the garment identification system 114 determines a confidence representing the sameness between an intake garment and a stored garment based on the distances between their characteristic vectors (e.g., a short distance indicates confidence, and a long distance indicates non-confidence). If the confidence value is above a threshold, the garment identification system 114 determines the intake garment and a stored garment are the same. In a third example, the garment identification system 114 may determine a probability the intake garment to the stored garment are the same. If the determined probability is above a threshold, the garment identification system 114 determines the intake garment and the stored garment are the same.

Additionally, determining the sameness between garments can be quantified in a variety of manners. For example, sameness can be measured by a length of the distance between two characteristic vectors, a number of elements between characteristic vectors that are identical, a threshold number of elements having probabilities indicating sameness between two characteristic vectors, or some other appropriate measure of sameness (e.g., distances in metric space, distances in Euclidean space, etc.). In practice, as previously described, sameness may indicate that two garments are the same, or substantially similar, depending on the circumstance. For instance, two garments having the same make, color, release date, but different sizes may be considered the same or substantially similar in one configuration, or not the same or substantially similar in another configuration, depending on the implemented definition of sameness.

II.C Identifying an Intake Garment is the Same as a Stored Garment

To increase efficiency of the garment marketplace, the garment identification system is configured to determine whether an intake garment is the same as a stored garment. To elaborate, generally, the garment identification system 114 captures a display image of an intake garment if the garment identification model 230 is unable to classify the garment represented in a classification image, or the classification does not match the classification of a stored garment.

For instance, consider an example intake garment that is a pair of blue suede shoes. In a first circumstance, the garment identification model 230 is unable to classify the blue suede shoes in its classification image. This could occur because the garment identification model 230 has not been sufficiently trained to identify blue suede shoes, this is the first time the garment marketplace 100 has received this type of blue suede shoes, or for some other reason. In a second circumstance, the garment identification model is able to classify the blue suede shoes in its classification image. However, the garment identification system is unable to identify a stored garment in the garment store matching the classification.

As such, in either circumstance, the garment identification system 114 translates the blue suede shoes to the display imager 240 and the display imager 240 captures a display image of the blue suede shoes. The garment identification system 114 stores the display image in the garment information datastore 260. Additionally, because the blue suede shoes were not previously identified, the model training system 250 may generate a characteristic vector for the blue suede shoes as described below.

As described above, this process is inefficient when the intake garment is the same as a stored garment. In this case, the garment identification system 114 does not capture a display image of the intake garment. Instead, the garment identification system 114 utilizes the display image associated with the stored garment as the display image for the intake garment.

Figure 3:
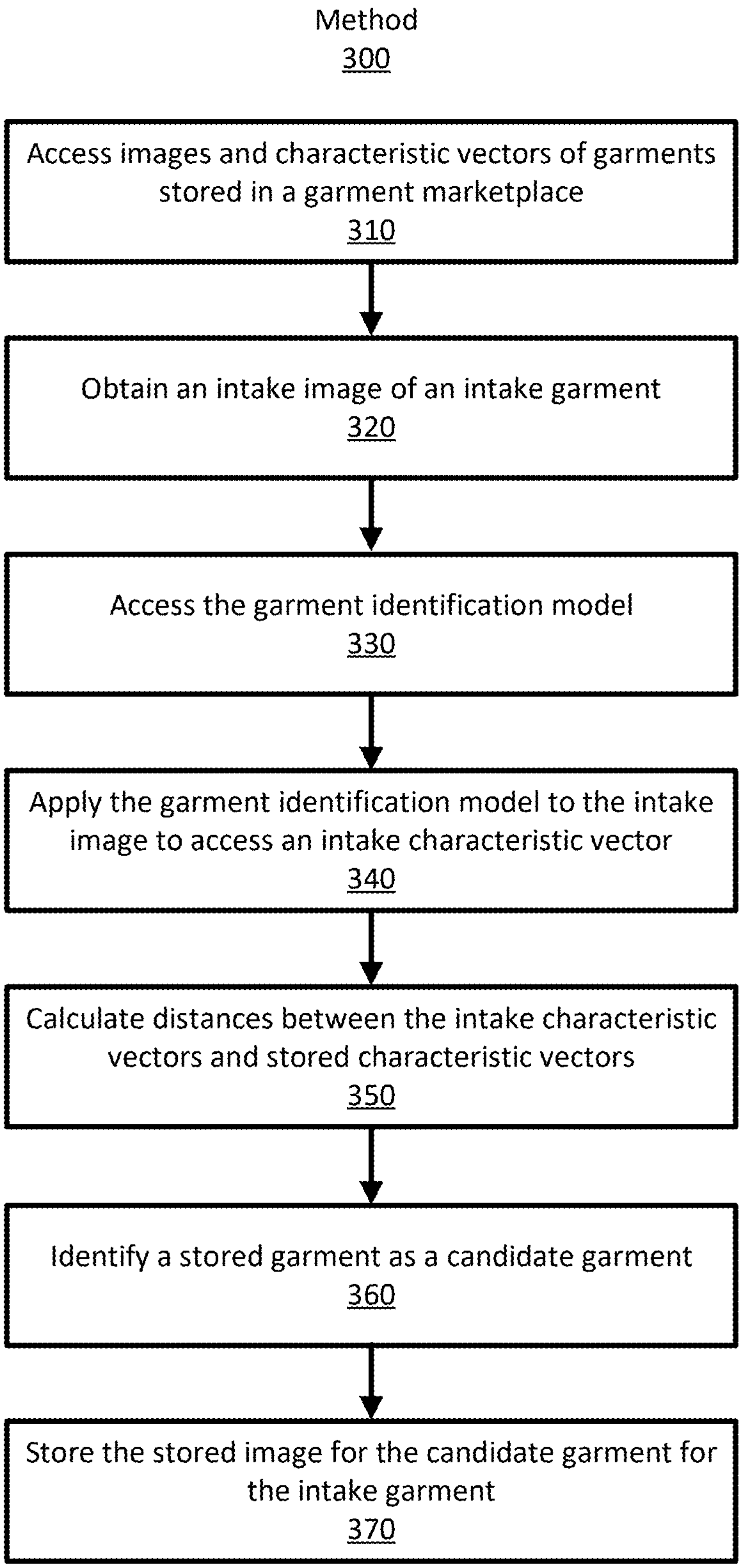
FIG. 3 is a process flow illustrating a method to identify a garment marketplace, according to one example embodiment.

FIG. 3 illustrates a method for identifying an intake garment for a garment marketplace during a garment intake process, according to one example embodiment. In various examples, method 300 can include additional or fewer steps or the steps may be accomplished in other orders. Moreover, the method 300 can repeat any of the steps, or any series of steps, at any time.

In the illustrated example of method 300, the garment marketplace 100 stores a set of garments in the garment store 120. Each of the stored garments has been previously identified and is associated with a corresponding display image. Additionally, each of the stored garments is associated with a characteristic vector representing characteristics of the stored garment.

The garment identification system 114 receives a garment from a user of the garment marketplace 100 ("intake garment"). As the garment intake process begins at receipt of the intake garment, the garment identification system 114 accesses 310 stored images and characteristic vectors for each of the stored garments in the garment marketplace 100.

The intake garment is processed by the garment identification system 114. In doing so, the garment identification system 114 moves the intake garment through the garment marketplace 100 using the classification conveyor 220. While the garment is moving along the classification conveyor 220, the garment identification system 114 obtains a classification image of the intake garment ("intake image") using the classification imager 210. The intake image includes pixels comprising latent information representing various characteristics of the imaged intake garment.

The garment identification system 114 accesses 330 the garment identification model 230. The garment identification model 230 is trained to input the intake image and output a classification of the intake image. That is, the garment identification model 230 generates a characteristic vector representing characteristics of the intake garment in the image.

The garment identification system 114 applies 340 the garment identification model 230 to the intake image. In doing so, the garment identification model 230 accesses 350 a characteristic vector of the intake garment ("intake characteristic vector"). The intake characteristic vector represents various characteristics of the intake garment identified in the intake image. As described below, the garment identification model 230 may access the intake characteristic vector from various levels of the model.

The garment identification system 114 calculates 350 distances between the intake characteristic vector and each of the stored characteristic vectors. As described above, the calculated distances can indicate the intake garment is the same as one of the stored garments (or is not the same as one of the stored garments).

The garment identification system 114 identifies 360 a stored garment as a candidate garment based on the calculated distances. To do so, the garment identification model 230 calculates a confidence value representing the distances between stored characteristic vectors garment and the intake characteristic vector for each stored garment. If the confidence value for a particular stored garment is above a threshold, the garment identification model 230 identifies the particular stored garment as the candidate garment.

Because the confidence score is above a threshold, the garment identification system 114 identifies that the intake garment and the candidate garment are the same. As such, rather than capturing a display image for the intake garment, the garment identification system 114 stores 370 the display image for the candidate garment as the display image for the intake garment. That is, the garment identification system 114 stores the stored image for the candidate garment located in the garment identification datastore as a stored image (i.e., display image) for the intake garment in the garment identification datastore. In doing so, the garment identification system 114 reduces the amount of time necessary to process an intake garment and reduces the amount of information needed to be stored in the garment information datastore 260. Once identified, the garment identification system 114 employs the intake garment in the garment store 120 using the storage system 116.

III. Garment Identification Model

The garment identification system 114 includes a model training system 250 configured to train the garment identification model 230 to determine whether a garment represented in a classification image is the same as a garment in the garment store 120 based on characteristic vectors is a complex process. As part of this process, the model training system 250 trains the garment identification model 230 to generate a characteristic vector for each unique garment. Training the garment identification model 230 to do so can be accomplished in a variety of manners.

III.A Model Training—User Generated Characteristic Vectors

In a first example, the model training system 250 trains the garment identification model 230 to generate a characteristic vector for a garment using labelling and supervised learning. To illustrate, consider an example where a received garment is a pair of red sequenced slippers. Moreover, the garment marketplace 100 is not storing the same red sequenced slippers in the garment store 120 and therefore does not include a stored characteristic vector for red sequenced slippers in the garment information datastore 260.

In this example, the garment identification system 114 captures a display image of the red sequenced slippers and provides the image to the garment identification model 230 (because the garment identification system 114 could not classify the slippers and/or could not determine it matched a stored garment). The garment identification system 114 provides the display image to a user of the garment identification system 114 and the user labels the image with characteristics. The labelled characteristics are included in the characteristic vector for the garment in the display image. For instance, the user may label the image with characteristics of the garment, e.g., "red" in color, "slippers" in type, "small" in size, and "sequenced" in extra. Labeling the image may include adding metadata tags reflecting the characteristics to the image, specifying pixels in the image corresponding to the garment, etc.

Once labeled, the display image and the labelled characteristic vector are used to train the garment identification model 230 to generate a characteristic vector for red sequenced slippers. That is, the garment identification model 230 is trained to associate latent features in the labelled image with the labelled characteristic vector. Thus, when an image including red sequenced slippers is input to the garment identification model 230, the garment identification model 230 will classify the image with the characteristic vector for red sequenced slippers. In other words, the garment identification model 230 will associate latent features in the input image representing red sequenced slippers with the characteristic vector for red sequenced slippers (by modifying weights and parameters, as described below) and classify the input image with that characteristic vector.

Over time, the labelling and training process trains the garment identification model 230 to identify any possible garment received by the garment marketplace 100. Therefore, as the ability of the classifier to identify unique garments increases, the garment identification system 114 will become more efficient because, over time, there will be a corresponding decrease in the number of display images it needs to create for the garment marketplace 100.

III.B Model Training—User Selection of Display Images

In a second example, the model training system 250 trains the garment identification model 230 to refine generation of characteristic vectors using labelling and supervised learning. To illustrate, consider an example where a received garment is a little black dress. Moreover, the garment marketplace 100 is storing many little black dresses in the garment store 120, some of which are the same, and some of which are not the same. Because many of the little black dresses are visually similar, the corresponding stored characteristic vectors in the garment information datastore 260 will also be similar (e.g., very close in distance). Accordingly, the garment identification model 230 may have trouble appropriately classifying the dresses and the garment identification system 114 may have trouble determining which of the stored little black dresses is the same as the received little black dress based on their characteristics vectors.

Continuing with the example, the garment identification system 114 captures a classification image of the little black dress as part of the garment intake process. The garment identification system 114 provides the classification image to the garment identification model 230 and the garment identification model generates a characteristic vector for the classification image. As described above, the garment identification system 114 is unable to confidently determine which of the stored garments in the garment marketplace 100 is the same as the little black dress in the classification image based on the characteristic vectors.

In this case, the garment identification system 114 may provide one or more display images of stored little black dresses and their corresponding characteristic vectors to a user of the garment identification system 114 such that the user may assist in accurately classifying the received little black dress in the classification image. The garment identification system 114 may provide display images according to several different criteria. For example, the garment identification system 114 may provide all display images with above a threshold confidence value, a number of display images less than a threshold distance away from one another, a number of display images with the highest confidence values or closest distances, etc. Whatever the circumstance, the various criteria aim to provide the user with display images and characteristic vectors which are the "best guess" of the garment identification model 230 as to which little black dress is included in the classification image.

In response to receiving the display images and their characteristic vectors, the user may either (1) provide a selection of a display image and characteristic vector that includes a stored little black dress that is the same as the received little black dress, or (2) indicate that none of the provided display images or characteristic vectors includes the received little black dress.

In response to the former condition (1), the garment identification model 230 then labels the classification image with the received little black dress with the characteristic vector for the stored little black dress. Once labelled, the garment identification system 114 uses the classification image to train the garment identification model 230. Here, the training causes the garment identification model 230 to more accurately generate a characteristic vector for the received little black dress in the future. That is, the garment identification model 230 will additionally associate latent features in the classification image with the appropriate characteristic vector (e.g., by modifying weights and parameters as described below). In doing so, the garment identification model 230 becomes more adept at correctly classifying little black dresses and identifying that they are the same as a stored little black dress.

In response to the latter condition (2), garment identification system 114 requests the user label the image in a manner similar to the training method described above (e.g., the user generates a characteristic vector). Once labelled, the garment identification system 114 uses the classification image to train the garment identification model 230. In some embodiments, the garment identification system 114 may also send the little black dress to the display imager 240 when a user indicates none of the provided display images include the received little black dress. Additionally, the garment identification system 114 may use the new display image and labelled characteristic vector to further train the garment identification model 230.

III.C Model Training—User Provided Characteristic Vector Elements

In a third example, the model training system 250 trains the garment identification model 230 to refine generation of characteristic vectors using labelling and supervised learning. To illustrate, consider an example where a received garment is a pair of denim blue jeans. Much like the previous example, the garment marketplace 100 is storing many denim blue jeans, but none of them are the same as the received denim blue jeans.

Continuing the example, the garment identification system 114 captures a classification image of the denim blue jeans as part of the garment intake process, and the garment identification system 114 provides the classification image to the garment identification model 230. The garment identification model 230 determines the classification image includes denim blue jeans but is unable to determine the specific characteristic vector for the received blue jeans in the image. For instance, the garment identification model 230 may be able to generate a characteristic vector including every characteristic of the denim blue jeans except for the make of the blue jeans.

In this case, the garment identification system 114 may provide the user with a characteristic vector including elements which it is able to confidently identify. For instance, the garment identification model 230 may provide a characteristic vector including the elements, "blue" in color, "denim" in material, and "jeans" in type. The garment identification model may request the user provide elements corresponding to characteristics it was unable to confidently identify (e.g., make, size, etc.), and the user may provide those elements in response.

The garment identification system 114 can perform several non-exclusive actions in response to receiving elements for a characteristic vector from the user. First, the garment identification system 114 may train the garment identification model 230 with the classification image of the intake blue jeans and the characteristic vector including model identified elements and user identified elements using the methods described hereinabove. Second, if the user provides elements to the characteristic vector such that the characteristic vector for the intake denim blue jeans matches the characteristic vector of stored denim blue jeans, the garment identification system 114 may use the display image of the stored denim blue jeans in the garment marketplace 100. Third, if the user provides elements to the characteristic vector such that the characteristic vector for the intake denim blue jeans does not match the characteristic vector of stored denim blue jeans, the garment identification system 114 may generate a display image using the display imager 240 (and further train the garment identification model 230 using the generated display image and characteristic vector).

III.D Increasing Model Efficiency

As the garment identification model 230 is trained to identify more and more garments, methods of improving garment identification model 230 classification efficiency is beneficial to allowing the garment marketplace 100 to rapidly process garments during the intake process. Garment identification may be configured in a variety of manners to increase garment identification model 230 efficiency. The examples discussed below are non-exclusive.

In a first example, the garment identification system 114 may be configured to capture classification images with the same properties. For instance, as described above, the classification imager 210 may capture images such that classification images have the same white balance, focus, size, etc. In some cases, the garment identification system 114 may apply one or more pre-processing functions to a classification image to make them the same. For example, the garment identification system 114 may apply a white-balancing function to classification images such that they all have the same white balance. By creating classification images that are the same, the garment identification model 230 can more accurately identify characteristics of garments between images, e.g., each classification image has the same value for white.

In a second example, the garment identification system 114 may be configured to capture classification images that are the same as display images. For instance, the classification imager 210 may be configured such that it captures images that are the same as display images. To illustrate, the classification conveyor 220 may be structured such that garments may travel through an environment similar to that provided by a display imager. For example, the classification conveyor 220 may include high quality lighting, white or reflected backgrounds, etc. such that a classification image would be the same as a display image. By creating classification images that are the same as display images, the garment identification model 230 can more accurately identify characteristics of garments based on characteristic vectors generated from display images (because the image environments are the same). Additionally, if the classification image is the same as between images, the garment identification system 114 may store classification images in the garment information datastore (rather than capturing and storing display images).

In a third example, the garment identification system 114 may be configured to capture classification images that include fiducials. The fiducials may be used to indicate the orientation and position of the garment within the image. Moreover, the classification imager 210 may be configured to capture classification images such that fiducials are in the same place between images, and/or garments are located within the image at similar positions relative to the fiducials. In some configurations, the garment identification system 114 may apply one or more pre-processing functions to classification images including fiducials to make them the same. For instance, the garment identification system 114 may crop a classification image such that the fiducials are at the four corners of a classification image. Because the classification images are cropped according to the imaged fiducials, the garment identification model 230 may be more accurately and/or efficiently identify garments in the classification images.

In a fourth example, the garment identification system 114 may be configured to receive one or more elements of a characteristic vector, and the garment identification model 230 may be configured to filter characteristic vectors of stored garments based on those received elements. For instance, as part of the intake process, a user of the garment identification system 114 may identify one or more characteristics of a received garment (e.g., "red" in color, "jacket" in type). In another example, an optical character recognition algorithm applied to a classification image may determine one or more characteristics of the garment (e.g., size on a tag, brand printed on fabric, etc.). Those characteristics may be associated with the garment within the garment marketplace 100 (e.g., via the SKU for the garment). Once, the garment identification system 114 captures a classification image, the previously identified characteristics are associated with the classification image such that its characteristic vector includes elements corresponding to those previously identified characteristics. In this case, the garment identification model 230 may populate the remaining elements of the characteristic vector using the classification methods described hereinabove. Because the classification image begins with several elements in its characteristic vector, the garment identification model 230 may more efficiently populate the remaining elements of the characteristic vector.

In a fifth example, the garment identification system 114 may be configured to allow a display image for a stored garment to be used for a newly received garment that has not been previously identified (rather than capturing a new image) when the two garments have a sufficient level of sameness. To illustrate, consider an example where the garment marketplace 100 is storing identical garments in sizes small, medium, and large. The garment marketplace 100 is also storing a display image for each of the identical garments. Now, the garment marketplace 100 receives the identical garment but having the size extra-large. In this instance, the garment identification system 114 may utilize the display image for the large garment rather than capturing a new display image for the extra-large garment because the characteristic vector for the large garment and the extra-large garment have a high degree of sameness. As described above, the degree of sameness can be different in different embodiments. Whatever the implementation, configuring the garment identification system 114 to capture a reduced number of display images enables a more efficient garment marketplace 100.

III.E Model Structure

There are several methods to generate a characteristic vector for a garment in a classification image. In a broad sense, the garment identification system 114 employs a garment identification model 230 to generate a characteristic vector for a classification image. That is, the garment identification system 114 can apply the garment identification model 230 to classification images to identify characteristics and features (e.g., size, color, shape, make, etc.) representing a garment in a classification image.

Figure 4:
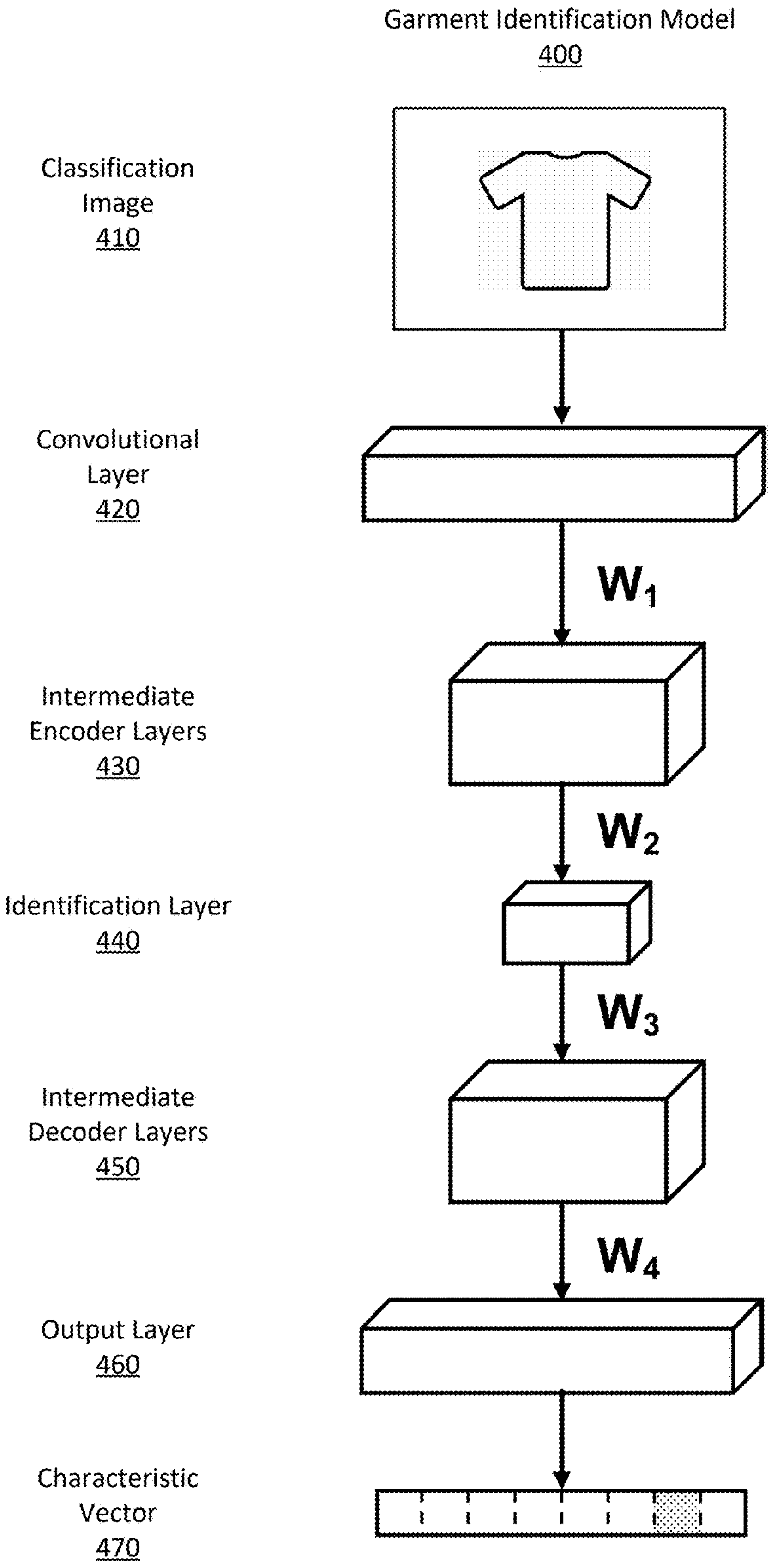
FIG. 4 is a representation of a garment identification model, according to one example embodiment.

FIG. 4 is a representation of a garment identification model 230, according to one example embodiment. As described in greater above, the garment identification model 230 is trained using previously captured classification image, display images, and their associated characteristic vectors. The characteristic vectors may have been determined by another garment identification model 230 or a human labeler.

In the illustrated embodiment, the garment identification model 400 (e.g., garment identification model 230) is a convolutional neural network model with layers of nodes, in which values at nodes of a current layer are a transformation of values at nodes of a previous layer. A transformation in the model 400 is determined through a set of weights and parameters connecting the current layer and the previous layer. For example, as shown in FIG. 4, the example model 400 includes five layers of nodes: layers 420, 430, 440, 450, and 460. The garment identification system 114 applies the function $W_1$ to transform from layer 420 to layer 430, applies the function $W_2$ to transform from layer 430 to layer 440, applies the function $W_3$ to transform from layer 440 to layer 450, and applies the function $W_4$ to transform from layer 450 to layer 460. In some examples, the transformation can also be determined through a set of weights and parameters used to transform between previous (or future) layers in the model. For example, the transformation $W_4$ from layer 450 to layer 460 can be based on parameters used to accomplish the transformation $W_1$ from layer 420 to 430 (i.e., back-propagating and forward-propagating information).

The garment identification system 114 inputs a classification image 410 (or a display image) to the model 400 and encodes the image onto the convolutional layer 420. After processing by the garment identification system 114, the model 400 outputs a characteristic vector 470 decoded from the output layer 460. The garment identification system 114 employs the model 400 to identify latent information in the classification image 410 representing characteristics of garments in the identification layer 440. The garment identification system 114 reduces of the dimensionality of the convolutional layer 420 to that of the identification layer 440 to identify characteristics of garments, and then increases the dimensionality of the identification layer 440 to generate a characteristic vector 470 (as needed).

As previously described, the garment identification system 114 encodes the classification image 410 to a convolutional layer 420. In one example, classification image 410 is directly encoded to the convolutional layer 420 because the dimensionality of the convolutional layer 420 is the same as a pixel dimensionality (e.g., number of pixels) of the classification image 410. In other examples, the classification image 410 can be adjusted such that the pixel dimensionality of the classification image 410 is the same as the dimensionality of the convolutional layer 420. For example, the classification image 410 may be cropped, reduced, scaled, down-sampled, etc.

The garment identification system 114 applies the model 400 to relate classification image 410 in the convolutional layer 420 to characteristics of garments in the identification layer 440. The garment identification system 114 retrieves relevance information between these elements by applying a set of transformations (e.g., $W_1$, $W_2$, etc.) between the corresponding layers. Continuing with the example from FIG. 4, the convolutional layer 420 of the model 400 represents an encoded classification image 410, and identification layer 440 of the model 400 represents garment characteristic information. The garment identification system 114 identifies garment characteristics in a classification image 410 by applying the transformations $W_1$ and $W_2$ to the pixel values of the classification image 410 in the space of convolutional layer 420. The weights and parameters for the transformations may indicate relationships between information contained in the classification image 410 and the identification of garment characteristics. For example, the weights and parameters can be a quantization of shapes, colors, makes, etc. included in information representing garments included in a classification image 410. The garment identification system 114 may learn the weights and parameters using historical user interaction data. That is, the garment identification system 114 can access characteristic vectors submitted by users to train the weights and parameters.

In one example, the weights and parameters for garment and particulate identification can be collected and trained using data collected from previously classification images 410 and a labelling process as described above. The labelling process reduces the amount of time required by the garment identification system 114 employing the model 400 to identify pixels representing garment characteristics while also increasing the accuracy of identified characteristics. The labelling process can include any of the methods described hereinabove.

Garment characteristics in the classification image 410 are identified in the identification layer 440. The identification layer 440 is a data structure representing identified garments characteristics based on the latent information about the garments represented in the classification image 410.

As described previously, identified garment characteristics in a classification image 410 can be used to generate a characteristic vector 470. To generate a characteristic vector 470, the garment identification system 114 employs the model 400 and applies the transformations $W_3$ and $W_4$ to the values of the identified garments and particulate level in identification layer 440. The transformations result in a set of nodes in the output layer 460. The weights and parameters for the transformations may indicate relationships between identified garment characteristics and a characteristic vector 470. In some cases, the garment identification system 114 directly outputs a garment characteristic vector 470 from the nodes of the output layer 460, while in other cases the garment identification system 114 decodes the nodes of the output layer 460 into a characteristic vector 470. That is, model 400 can include a conversion layer (not illustrated) that converts the output layer 460 to a characteristic vector 470.

Additionally, the model 400 can include layers known as intermediate layers. Intermediate layers are those that do not correspond to a classification image 410, garment identification, or a characteristic vector 470. For example, as shown in FIG. 4, layers 430 are intermediate encoder layers between the convolutional layer 420 and the identification layer 440. Layer 450 is an intermediate decoder layer between the identification layer 440 and the output layer 460. Hidden layers are latent representations of different aspects of a garment that are not observed in the data but may govern the relationships between the elements of an image when identifying garment characteristics. For example, a node in the hidden layer may have strong connections (e.g., large weight values) to input values and identification values that share the commonality of "long sleeves." As another example, another node in the hidden layer may have strong connections to input values and identification values that share the commonality of "black dress." Specifically, in the example model of FIG. 4, nodes of the hidden layers 430 and 450 can link inherent information in the classification image 410 that share common characteristics to help determine if that information represents a garment in the classification image 410.

Additionally, each intermediate layer is a combination of functions such as, for example, residual blocks, backpropagation, forward propagation, loss functions, gain functions, convolutional layers, pooling operations, skip connections, concatenations, etc. Any number of intermediate encoder layers 430 can function to reduce the convolutional layer to the identification layer and any number of intermediate decoder layers 450 can function to increase the identification layer 440 to the output layer 460.

Notably, the structure of the garment identification model 230 described in FIG. 4 is an example and other example structures are also possible. For instance, the garment identification model 230 may extract a characteristic vector from an intermediate layer of the garment identification model 230 rather than an output layer of the garment identification model 230. In another example, the structure of the neural network may generate an image vector by training the transformation functions to produce vector output like an already trained vector.

III.F Storing a Trained Model

In some cases, the garment identification model 230 can be translated between garment marketplace 100*s* such that each garment marketplace 100 may independently identify garments for a garment intake process using characteristic vectors. The garment identification model 230 may be configured such that each garment marketplace 100 can further train the model to identify garments, or further model training may be disabled.

Figure 5:
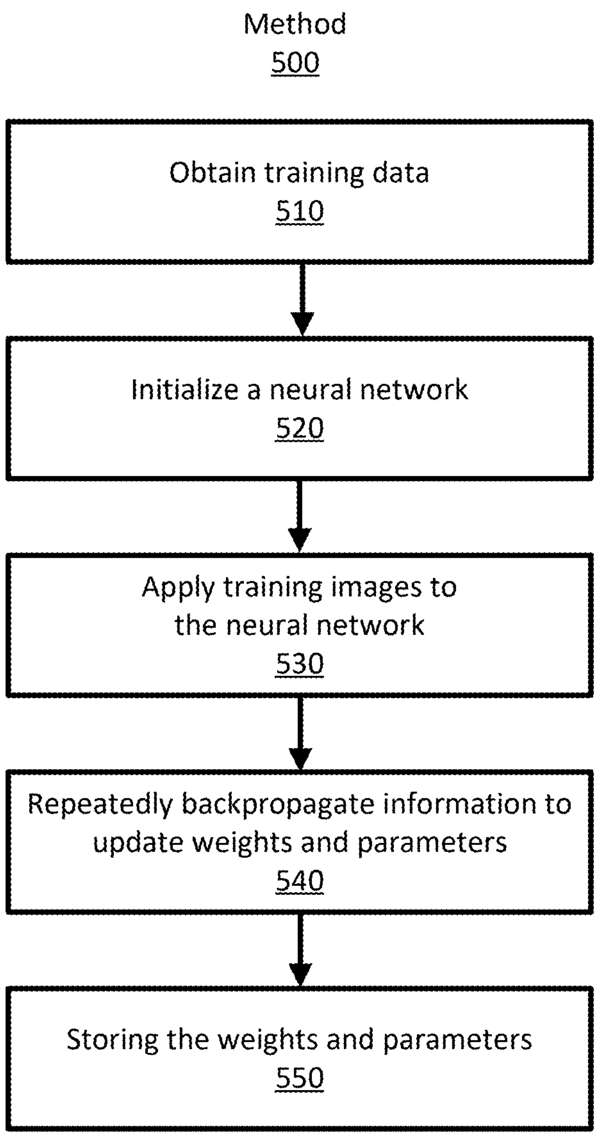
FIG. 5 is a process flow illustrating a method to train a garment identification model to generate characteristic vectors and store that garment indemnification model, according to one example embodiment.

FIG. 5 is a process flow illustrating a method to train a garment identification model 230 to generate characteristic vectors and store that garment indemnification model, according to one example embodiment. In various examples, method 500 can include additional or fewer steps or the steps may be accomplished in other orders. Moreover, the method 500 can repeat any of the steps, or any series of steps, at any time.

The garment identification system 114 obtains 510 training data. As described above, the training data can include either display images or classification images (in aggregate, "training images"). Each of the training images includes pixels whose latent information represents characteristics of a garment pictured in the training image. Additionally, each of the training images corresponds to a characteristic vector for that training image. The characteristic vector represents identified characteristics of the garment in the training image. Elements of the characteristic vector can be identified using the methods described hereinabove.

The garment identification system 114 initializes 520 a neural network configured to generate characteristics vectors, e.g., the neural network described in FIG. 4. The neural network generates characteristic vectors by applying transformation functions to each layer of the neural network that function to identify characteristics of the garment using the latent information. In an example, the neural network includes an encoder layer, an identification layer, and a decoder layer. The encoder layer encodes images (e.g., display images, classification images, training images) on a layer of the neural network. The identification layer identifies characteristics of garments in images using latent information in the image. The output layer outputs characteristic vectors representing garment characteristics identified in the image. The transformation functions translate information between the layers according to weights and parameters.

The garment identification system 114 trains the garment identification model 230 with the training images. To do so, the garment identification system 114 applies 530 the training image to the neural network such that the transformation functions of the neural network are trained to output the characteristic vector corresponding to the training vector. In doing so, the garment identification system 114 repeatedly backpropagates 540, through the neural network information from the transformation functions to update the weights and parameters.

Once trained, the garment identification system 114 stores 550 the garment identification model 230 on a datastore of the garment marketplace 100. In various configurations, that may include storing updated set of weight and parameters, the transformation functions, and/or the structure of the neural network on a datastore of the garment marketplace 100. In additional configurations, the garment identification system 114 may also store the training images and their corresponding characteristic vectors on a datastore of the garment marketplace 100.

In this manner, the garment marketplace 100 can send the garment identification model 230 (i.e., by sending and of the updated set of weights and parameters, the transformation functions, and/or the structure of the neural network) to another garment marketplace. Once the other garment marketplace instantiates a neural network using the received garment identification model 230, it can employ the received garment identification model 230 to generate characteristic vectors for received garments.

IV. Example Computer System

Figure 6:
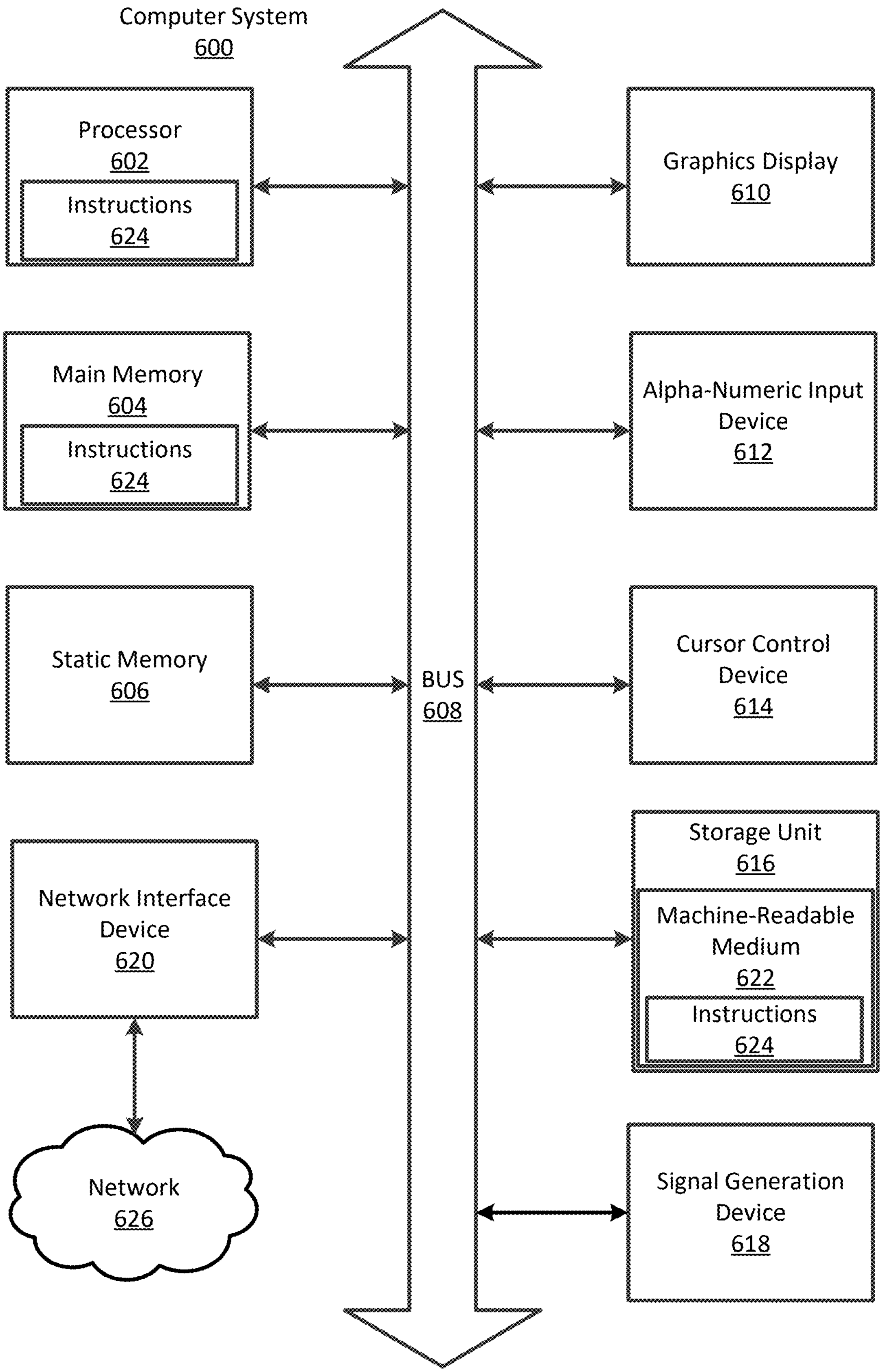
FIG. 6 is a block diagram illustrating components of an example machine for reading and executing instructions from a machine-readable medium, according to one example embodiment.

FIG. 6 is a block diagram illustrating components of an example machine for reading and executing instructions from a machine-readable medium, according to one example embodiment. Specifically, FIG. 6 shows a diagrammatic representation of garment identification system 114 in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 100, or as a peer machine in a peer-to-peer (or distributed) system environment 100.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 600 can include a static memory 606, a graphics display 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. For example, the instructions 624 may include the functionalities of modules of the system 130 described in FIG. 1. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 (e.g., network 120) via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

V. Additional Considerations

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for identifying an intake garment during a garment intake process for a garment marketplace, the method comprising:

obtaining an intake image of the intake garment, the intake image captured when the intake garment is received and processed using an intake system of a physical storage system of the garment marketplace;

applying a garment identification model to the intake image to generate an intake characteristic vector representing characteristics of the intake garment;

calculating distances between the intake characteristic vector and a plurality of stored characteristic vectors, each stored characteristic vector representing characteristics of a corresponding stored garment of a plurality of stored garments in the garment marketplace;

determining a candidate garment of the plurality of stored garments is substantially similar to the intake garment when a distance between a stored characteristic vector for the candidate garment and the intake characteristic vector for the intake garment is above a threshold; and responsive to determining the candidate garment is substantially similar to the intake garment, store a previously stored image for the candidate garment as a stored image for the intake garment in the garment marketplace.

2. The method of claim 1, wherein identifying the candidate garment of the plurality of stored garments further comprises:

sending, for display, the stored image for the candidate garment to a user device; and receiving, from the user device, a confirmation that the candidate garment is substantially similar to the intake garment.

3. The method of claim 1, further comprising:

identifying at least one additional stored garment of the plurality of stored garments as at least one additional candidate garment of a set of candidate garments;

sending, for display, display images for the candidate garment and the set of candidate garments to a user device; and receiving, from the user device, a selection representing which candidate garment that is substantially similar to the intake garment.

4. The method of claim 1, further comprising:

responsive to the distance between the intake characteristic vector and stored characteristic vectors for the plurality of stored garments being below the threshold, translating the intake garment to a garment processing system configured to generate a stored image of the intake garment for the stored images of the garment marketplace.

5. The method of claim 1, wherein the garment intake process occurs while the intake garment is translating along a garment translation system.

6. The method of claim 1, wherein the garment identification model identifies the intake garment in less than a threshold amount of time.

7. The method of claim 1, further comprising:

receiving one or more previously identified elements of the intake characteristic vector.

8. The method of claim 7, further comprising:

filtering stored characteristic vectors used to identify the candidate garment based on the one or more previously identified elements of the intake characteristic vector.

9. The method of claim 1, further comprising:

receiving feedback from a user about a match quality of the candidate garment and the intake garment; and training the garment identification model to associate the intake characteristic vector with the stored characteristic vector for the candidate garment based on the feedback.

10. The method of claim 1, wherein the intake image of the intake garment comprises a foreground and a background and the method further comprises:

separating the foreground and the background in the intake image; and generating the intake characteristic vector representing characteristics of the intake garment based on the foreground of the intake image.

11. The method of claim 1, wherein the intake image of the intake garment comprises one or more visual fiducials and the garment identification model is further configured to:

identify the one or more visual fiducials in the intake image; and generate the intake characteristic vector representing characteristics of the intake garment based on the identified one or more visual fiducials in the intake image.

12. The method of claim 1, wherein obtaining the intake image further comprises:

processing the intake image to normalize one or more visual characteristics of the intake image.

13. The method of claim 1, wherein applying the garment identification model to generate the intake characteristic vector further comprises:

extracting the intake characteristic vector from a layer of the garment identification model.

14. The method of claim 1, wherein applying the garment identification model to generate the intake characteristic vector further comprises:

extracting the intake characteristic vector from an intermediate layer of the garment identification model.

15. The method of claim 1, wherein applying the garment identification model to generate the intake characteristic vector further comprises:

extracting the intake characteristic vector from an output layer of the garment identification model.

16. A non-transitory computer readable storage medium storing instructions for identifying an intake garment during a garment intake process for a garment marketplace, the instructions, when executed by one or more processors, causing the one or more processors to:

obtain an intake image of the intake garment, the intake image captured when the intake garment is received and processed using an intake system of a physical storage system of the garment marketplace;

apply a garment identification model to the intake image to generate an intake characteristic vector representing characteristics of the intake garment;

calculate distances between the intake characteristic vector and a plurality of stored characteristic vectors, each stored characteristic vector representing characteristics of a corresponding stored garment of a plurality of stored garments in the garment marketplace;

determine a stored garment of the plurality of stored garments is substantially similar to the intake garment when a distance between a stored characteristic vector for the stored garment and the intake characteristic vector for the intake garment is above a threshold; and responsive to determining the stored garment is substantially similar to the intake garment, store a previously stored image for the stored garment as a stored image for the intake garment in the garment marketplace.

17. A system comprising:

a physical storage system for garments;

a garment marketplace storing images for each of a plurality of stored garments, each stored garment corresponding to a characteristic vector representing the stored garment;

an intake system configured to process intake garments for storing in the physical storage system and representing in the garment marketplace;

one or more processors; and a non-transitory computer readable storage medium storing instructions for identifying an intake garment during a garment intake process for the garment marketplace, the instructions, when executed by one or more processors, causing the one or more processors to:

obtain an intake image of the intake garment, the intake image captured when the intake garment is received and processed by the intake system;

apply a garment identification model to the intake image to generate an intake characteristic vector representing characteristics of the intake garment;

calculate distances between the intake characteristic vector and a plurality of stored characteristic vectors, each stored characteristic vector representing characteristics of a corresponding stored garment of a plurality of stored garments in the garment marketplace;

determine a candidate garment of the plurality of stored garments is substantially similar to the intake garment when a distance between a stored characteristic vector for the candidate garment and the intake characteristic vector for the intake garment is above a threshold; and responsive to determining the candidate garment is substantially similar to the intake garment, store a previously stored image for the candidate garment as a stored image for the intake garment in the garment marketplace.

* * * * *